S. B. ESHLEMAN.
MACHINE FOR MAKING AND ATTACHING BUTTON SHANKS.
APPLICATION FILED JUNE 19, 1905.
1,065,306.
Patented June 17, 1913.
2 SHEETS—SHEET 1.
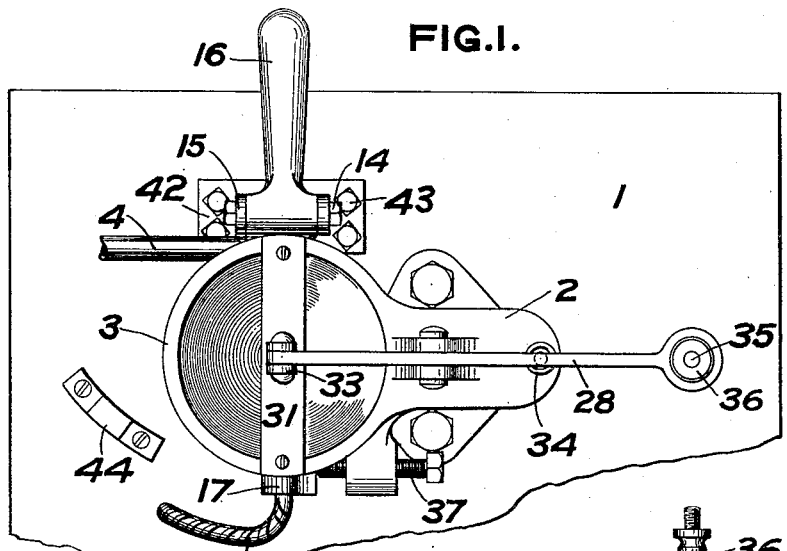
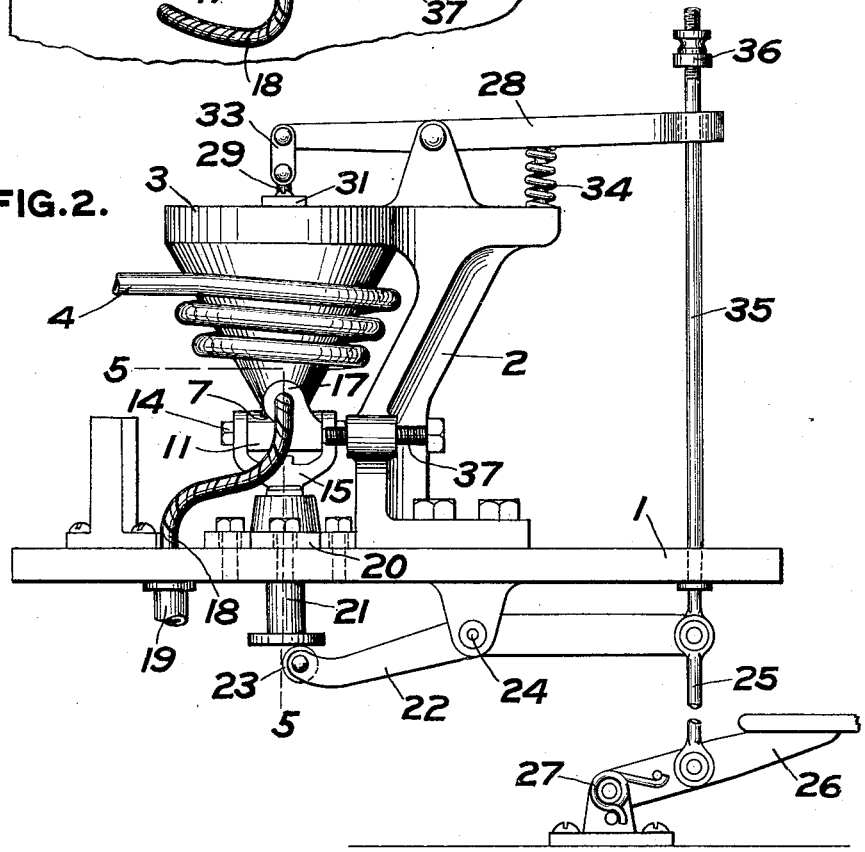
WITNESSES:
Clarence W. Carroll.
L. Thon.
INVENTOR
Samuel B. Eshleman
by Ogden & Davis his attys S. B. ESHLEMAN.
MACHINE FOR MAKING AND ATTACHING BUTTON SHANKS.
APPLICATION FILED JUNE 19, 1905.
1,065,306.
Patented June 17, 1913.
2 SHEETS—SHEET 2.
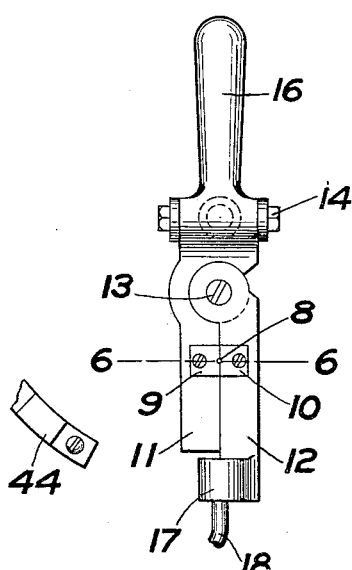
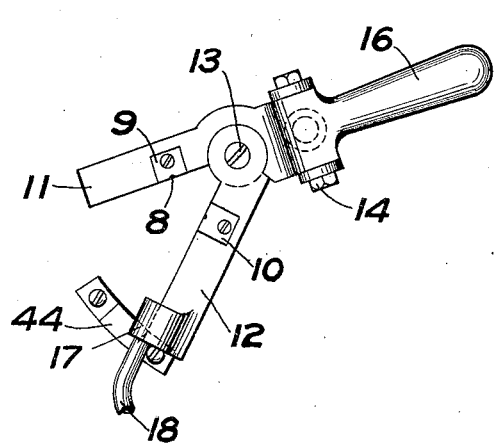
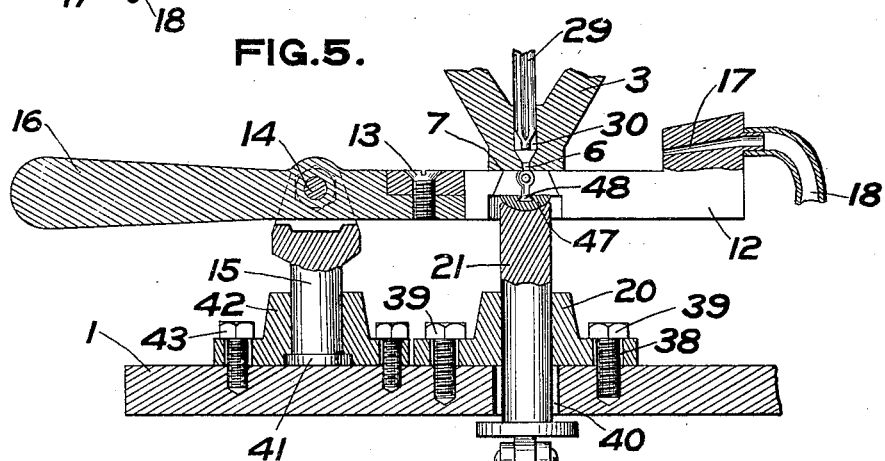
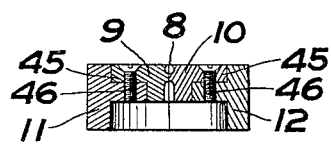
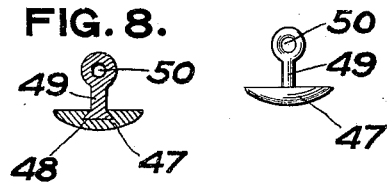
WITNESSES:
Clarence W. Carroll
L. Thow
INVENTOR
Samuel B. Eshleman
COLUMBIA PLANOGRAPH CO., WASHINGTON, D. C.

UNITED STATES PATENT OFFICE.

SAMUEL B. ESHLEMAN, OF ROCHESTER, NEW YORK, ASSIGNOR, BY MESNE ASSIGNMENTS, TO JOSEPH H. LAWLESS, THOMAS D. LAWLESS, AND ELIZABETH M. LAWLESS, ALL OF BROOKLYN, NEW YORK, A COPARTNERSHIP DOING BUSINESS AS FIRM OF UNION PEARL WORKS, OF NEW YORK, N. Y.

MACHINE FOR MAKING AND ATTACHING BUTTON-SHANKS.

1,065,306.   Specification of Letters Patent.   Patented June 17, 1913.

Application filed June 19, 1905.  Serial No. 265,872.

*To all whom it may concern:*

Be it known that I, SAMUEL B. ESHLEMAN, a citizen of the United States, and resident of Rochester, in the county of Monroe and State of New York, have invented certain new and useful Improvements in Machines for Making and Attaching Button-Shanks, of which the following is a specification.

This invention relates to machines for making and attaching button shanks, and consists in the apparatus hereinafter described and claimed.

The object of the invention is to make or form complete a button shank and simultaneously set or attach the same in the button head or blank.

In the drawings: Figure 1 is a top plan view of an apparatus embodying this invention; Fig. 2 is a side elevation of the same machine; Fig. 3 is a top plan view of the holding jaws stopped in the casting position; Fig. 4 is a top plan view of the same parts with the jaws open; Fig. 5 is a cross-section on the line 5—5 of Fig. 2; Fig. 6 is an enlarged cross-section on the line 6—6 of Fig. 3; Fig. 7 is a side elevation of a button with the shank attached thereto; and Fig. 8 is a section through a button blank, its shank and eye.

The apparatus consists of a table 1, having thereon a standard 2 which carries a melting pot 3 provided with means for heating it, such as the coiled gas pipe 4 outside of said melting pot. Upon the table is pivoted a mold or die for the button shank which is adapted to register with an orifice or outlet in the bottom of the melting pot. In the present instance the said orifice or outlet 6 (Fig. 5) is in the center of the bottom of the melting pot, which latter has a conical form. The bottom face 7 of the melting pot is fitted to the die, and said die is, with the form of shank herein shown and described, a two part die, having on the line of juncture a small gate 8 by which metal may flow from the orifice 6 of the casting pot into the interior of the mold or die. The said die is composed of two parts 9 and 10, each part being fastened upon a jaw 11 and 12 which are hinged together as at 13. The said jaws are carried by a horizontal bearing 14 upon a support 15 that is capable of rotation about a vertical axis, so that the pair of dies may be swung out from under the melting pot, and also when swung around underneath the melting pot may be swung upward into exact registry and fit with the bottom of said melting pot. Thus the jaws or die support is capable of both horizontal and vertical movement. A handle 16 is provided for the more convenient management of the dies. Means are provided when the said jaws are swung out from under the melting pot whereby the said jaws are opened to discharge the shanked button. Further means are provided whereby the outlet 6 from the melting pot is opened and closed at proper times, as hereinafter described. Means are provided for directing a blast of air, chilled if desired, upon the surface of the dies. In the present instance this consists of a nozzle 17 carried by the jaw 12, and connected by a flexible air tube 18 with a source 19 of compressed air. The nozzle is directed toward the surface of the dies, so that when they are not underneath the melting pot the blast of air is directed upon them to cool the dies and the button shank that may be therein.

Through a suitable guide 20 upon the table 1 passes a plunger 21 adapted upon its upper end to support the button blank hereinafter described, and directed by said guide 20 to a position directly under the dies 9 and 10, so that when the dies are in the casting position underneath the melting pot 3, the plunger on being lifted holds the button blank in proper position under the die so that the fluid metal from the melting pot may pass into the die and thence into the cavity in the button blank, as will be described hereafter. The plunger 21 is actuated by a lever 22 having, if desired, upon its end an anti-friction roller 23, and pivoted as at 24 to the table 1. The lever 22 is actuated by a link 25 connected to a treadle 26 for the operator to actuate. The treadle may, if desired, be normally lifted so as to allow the plunger 21 to drop away from the casting position, by a spring 27. Upon the standard 2 is pivoted a lever 28, which is connected to a valve rod or plunger 29, which extends through the melting pot, and when in its lowered position closes the orifice or outlet 6. The valve rod may be longitudinally grooved, as shown in Fig. 5, in order that by a small movement only the fluid metal may pass out from the melting pot, and whereby at the same time the melting pot itself, or a bore 30 therein connecting the said orifice or outlet 6, may guide the lower end of said rod 29. The said rod 29 is guided also by a bar 31 upon the upper end of the melting pot. The said rod 29 may be connected with the lever 28 by means of a link 33 if desired. A spring 34 tends to close the orifice 6 by the downward movement of the rod 29, and a link or rod 35 connected to the treadle 26 is adapted to move the lever 28 and open the orifice 6, at the same time compressing the spring 34. The orifice should be opened after the plunger 21 has put the button blank into the proper position for casting. For this purpose there is a loose movement as between the link or rod 35 and the lever 28, produced by the said link or rod passing through an orifice in the lever 28, and an adjustable nut or stop 36 upon the upper end of said rod is set at such distance as may be determined, from the lever.

Upon the standard 2 is an adjustable stop 37 with which the closed jaws 11 and 12 come into contact when the dies are in the exact casting position. The guide 20 is made adjustable upon the table 1 as, for instance, by having a series of holes 38 for the bolts 39 that hold it to the table, the said holes 38 being larger than the stems of the bolts so that the guide 20 may be adjusted accurately in place and then the bolts tightened to maintain it in position. Of course, the plunger 21 passes through an orifice 40 in the table, which orifice is considerably larger than the plunger. The rotatable support 15 for the casting jaws is made adjustable in like manner upon the table. The said support has at the bottom an enlarged flange 41, which may rest directly on the table, and the said flange and the stem of the support 15 fit in a split standard 42, each portion of which is fastened to the table by bolts 43 passing through enlarged holes in the parts of said standard.

Upon the table 1 is a stop 44, against which one of the jaws carrying the dies 9 and 10 impinges and holds said jaw stationary while the other jaw moves away from it in the rotation of said jaws about their vertical axis or support 15, and when moved away from the casting position. For this purpose the jaw 12 is made longer than the jaw 11, as shown. The dies 9 and 10 are made removable from the jaws 11 and 12 so that shanks of different forms and sizes may be produced in the same machine. For this purpose each die is provided with a flange 45 resting in a correspondingly shaped socket in the upper faces of the jaws 11 and 12, and each die part is suitably held in place upon the jaw as, for instance, by the screw 46.

As shown in Figs. 7 and 8, the button is formed of a blank 47, which has a socket 48 therein, the said socket being larger at the bottom. The bottom of the die parts 9 and 10 are of such shape as to fit upon the surface of the button blank 47 with the die orifice directly over the socket 48 when the parts are in the casting position with the outlet 6 from the casting pot in registry with the inlet 8 to the die. In the present form of device the button shank has a stem 49 terminated by an eye 50. The die parts are of such shape as each to form the mold for one-half of the said eye 50 and shank 49.

From the foregoing description it will be seen that my invention provides a machine which produces in one operation a completely formed shank, and at the same time affixes the shank in the button head or blank, and no after-operations are required to give form, shape or dimensions to the shank, or to provide the same with an eyelet.

What I claim is:—

1. A device for casting button shanks into button blanks comprising a melting pot having an outlet, a valve for said outlet, a two-part die adapted to form a shank and having a gate adapted to register with said outlet, means for setting said die in the casting position, means for supporting a socketed button blank underneath said die, and means for operating said valve.

2. A device for casting button shanks into button blanks comprising a melting pot having an outlet, a valve for said outlet, a movable two-part die adapted to form a shank and having a gate adapted to register with said outlet, means for setting said die in the casting position, means for supporting a socketed button blank underneath said die, and means for operating said valve.

3. A device for casting button shanks into button blanks comprising a melting pot having an outlet, a valve for said outlet, a movable two-part die adapted to form a shank and having a gate adapted to register with said outlet, means for setting said die in the casting position, means for supporting a socketed button blank underneath said die, means for opening said die when the same is moved from the casting position, and means for operating said valve.

4. A device for casting button shanks into button blanks comprising a melting pot having an outlet, a valve for said outlet, a two-part die adapted to form a shank and having a gate adapted to register with said outlet, means for setting said die in the casting position, a plunger adapted to support a socketed button blank underneath said die, means for operating said plunger, and means for operating said valve.

5. A device for casting button shanks into button blanks comprising a melting pot having an outlet, a valve for said outlet, a two-part die adapted to form a shank and having a gate adapted to register with said outlet, means for setting said die in the casting position, a plunger adapted to support a socketed button blank underneath said die, a treadle and connections therefrom for operating said plunger and for operating said valve.

6. A device for casting button shanks into button blanks comprising a melting pot having an outlet, a self-closing valve for said outlet, a two-part die adapted to form a shank and having a gate adapted to register with said outlet and a normally open outlet, means for setting said die in the casting position, means for supporting a socketed button blank underneath the outlet of said die, and means for opening said valve.

7. A device for casting button shanks into button blanks comprising a melting pot having an outlet, a valve for said outlet, a two-part die adapted to form a shank and having a gate adapted to register with said outlet, means for setting said die in the casting position, a plunger adapted to support a socketed button blank underneath said die, and means for operating said plunger to support said blank in the casting position, and connected means for subsequently opening said valve.

8. A device for casting button shanks into button blanks comprising a melting pot having an outlet, a valve for said outlet, a two-part die adapted to form a shank and having a gate adapted to register with said outlet, means for setting said die in the casting position, a plunger adapted to support a socketed button blank underneath said die, a treadle, and connections therefrom for operating said plunger and for subsequently operating said valve.

9. A device for casting button shanks into button blanks comprising a melting pot having an outlet, a valve for said outlet, a two-part die adapted to form a shank and having a gate adapted to register with said outlet, means for setting said die in the casting position, a plunger adapted to support a socketed button blank underneath said die, a treadle, and connections from said treadle, means actuated thereby for operating said plunger, and a loose connection between said treadle and said valve.

10. A device for casting button shanks into button blanks comprising a melting pot having an outlet, a gate for said outlet, a two-part die adapted to form a shank and having a gate adapted to register with said outlet, means for setting said die in the casting position, a plunger adapted to support a socketed button blank underneath said die, a treadle, a lever for actuating said plunger, a spring operated lever for actuating said valve, and connections from the treadle to the said levers for successively operating the plunger to support a blank under the die and for opening said valve.

11. A machine for forming and setting shanks in button-blanks, said machine comprising in combination a receptacle for the shank metal having an outlet, a mold for receiving metal from said outlet, said mold formed of movable sections for shaping the shank, and means for supporting the button blank in registry with the mold.

12. A machine for forming and setting shanks in buttons, said machine comprising in combination a receptacle for the shank metal having an outlet, a mold for forming the shank, means in said mold for forming an eyelet, inlet and outlet openings in said mold, a support for the button blank, and means for moving said mold to register its openings respectively with the outlet of said receptacle and with the button blank on said support.

13. A machine for providing button-blanks with shanks, which comprises in combination means for supporting the button-blank, and means for simultaneously forming and setting an eyeleted shank in the button-blank.

14. A machine for forming and setting shanks in buttons, said machine comprising in combination a receptacle for the shank metal having an outlet, a mold for forming the shank, said mold formed of relatively movable sections, a support for the button blank, means for moving said mold into and out of casting registry with said outlet and the button-blank on the support, and means automatically operative upon the mold sections during said movement to respectively close together and open said mold sections.

15. A machine for completely forming and simultaneously setting shanks in button blanks, said machine having in combination a receptacle for the shank metal, means to discharge the metal therefrom, a support for holding and positioning the button blank, a mold for forming the shank, means in said mold for forming an eyelet, and means for moving said mold to receive the discharge from said receptacle.

16. A machine for forming and setting shanks in button blanks, comprising in combination a receptacle for the shank metal, a plurality of mating mold sections for forming the shank, means integral with said mold sections for forming an eyelet in the shank, a support for the recessed button blank, means for registering said mold sections with the receptacle and the recess in the button blank on said support, and means to feed metal from said receptacle into the mold cavity formed by said mold sections, and the recess of the button blank.

17. A machine for providing button blanks with shanks, said machine comprising in combination a receptacle for molten metal, an outlet in said receptacle, a sectional die for forming the shank, means for bringing the die sections together and in casting position with respect to said outlet, a support for the button blank, means for moving said support to bring the blank into casting position with respect to said die, and means to separate the die sections.

18. In a device of the character described, the combination of a melting pot, an outlet for said pot, a valve for controlling said outlet, a sectional die for forming the shank, a pivotally mounted arm carrying said die, said arm having lateral and vertical movement for carrying the die into and out of casting position, a support for the button blank, means for moving said support to bring the blank into registry with the die when the latter is in casting position, means common to the blank support and the valve for operating the same, said means having fixed connection with the support and loose connection with the valve, substantially as described.

19. In a button-making machine, a support for a button-head formed with a recess for receiving the shank of the button, a mold formed of relatively movable sections, for forming the shank on the button-head, the mold having an exit orifice serving to register with the recess of the button-head, and a reservoir for supplying molten material to the mold.

20. In a button-making machine, a support for a button-head formed with a recess for receiving the shank of the button, a mold formed of relatively movable sections, for forming the shank on the button-head, said mold having inlet and exit orifices on opposite sides thereof, a reservoir for supplying molten material to the mold, the reservoir having an exit port, the inlet and exit orifices of the mold serving to register, respectively, with the exit port of the reservoir and the recess of the button-head.

21. In a button-making machine, a support for a button head formed with a recess for receiving the shank of a button, the support having means for holding the button-head with its recess presented upwardly, a mold formed of relatively movable sections for forming the shank on the button-head, said mold being disposed above the support and having inlet and exit orifices, respectively, in its upper and lower sides, and a reservoir for supplying molten material to the mold, the reservoir being located above the mold and having an exit port, the inlet and exit orifices of the mold serving to register, respectively, with the exit port of the reservoir and the recess of the button-head.

22. In a button-making machine, the combination of three elements, a support for a button-head, a mold formed of relatively movable sections for forming a shank on the button-head, and a reservoir for supplying molten material to the mold, one of said elements being movable relatively to the other elements into and out of operative relation with said other elements.

23. In a button-making machine, a support for a button-head having means for frictionally holding the button-head, a mold formed of relatively movable sections for forming a shank on the button-head, one of the foregoing elements being movable relatively to the other into position to permit the formation of the shank on the button-head, and out of said position for removing the button-head with the shank attached from the support, and a reservoir for supplying molten material to the mold.

24. In a button-making machine, a support for a button-head formed with a recess for receiving the shank of the button, the support having a socket for holding the button-head with its recess presented outwardly, a mold formed of relatively movable sections for forming the shank on the button-head, the mold having an exit orifice serving to register with the recess of the button-head and being normally out of registration therewith, one of the foregoing elements being movable relatively to the other for bringing the recess of the button-head and the exit orifice into registration to permit the formation of the shank on the button-head, and out of its position assumed when said recess and said exit orifice are in registration, for removing the button-head with the shank attached from the support, and a reservoir for supplying the molten material in the mold.

25. A machine for forming and setting shanks in buttons, said machine having in combination a receptacle for the shank metal, means to discharge the metal therefrom, a mold formed of relatively movable sections for shaping the shank, a support for the button-blank, means for moving the mold sections into and out of registry with the discharge from said receptacle and simultaneously closing and opening the same respectively during said movement.

26. In a button-making machine, a support for a button-head formed with a recess for receiving the shank of the button, a mold for forming the shank on the button-head, the mold having inlet and exit orifices on opposite sides thereof, and comprising two separable sections, a reservoir for supplying molten material to the mold, the reservoir having an exit port, the inlet and exit orifices of the mold serving to register, respectively, with the exit port of the reservoir and the recess of the button-head, and being normally out of registration therewith, means for moving the support for the button-head and the mold to bring said orifices into and out of registration, respectively, with said exit port and said recess, and means for moving the sections of the mold together when said orifices are registering with said exit port and said recess, and for separating said sections when said orifices and said exit port and recess are going out of register, substantially as and for the purpose described.

27. In a button-making machine, a support for a button-head, a mold for forming a shank on the button-head, the mold having an inlet orifice, a reservoir for supplying molten material to the mold, the reservoir having an exit port, the inlet orifice of the mold serving to register with the exit port of the reservoir and being normally out of registration therewith, a plunger for opening and closing said port, and means for moving the mold toward the reservoir to bring the inlet orifice thereof into registration with said exit port, and for moving the plunger relatively to said port, said means comprising a rocking element, means for actuating said element in one direction, and a spring for moving the same in the opposite direction, substantially as and for the purpose described.

28. In a button-making machine, a support for a button-head, a mold for forming a shank on the button-head, the mold having an inlet orifice, a reservoir for supplying molten material to the mold, the reservoir having an exit port, the inlet orifice of the mold serving to register with the exit port of the reservoir and being normally out of registration therewith, a plunger for opening and closing said port, and means for moving the mold toward the reservoir to bring the inlet orifice thereof into registration with the exit port, and for moving the plunger relatively to said port, said means comprising a rocking element, means for actuating said element in one direction, and a coiled spring encircling the rocking element and having one end fixed to a point exterior to said element, and its other end fixed thereto, substantially as and for the purpose specified.

29. A machine for forming and applying metal shanks to buttons comprising a receptacle for molten metal having an outlet nozzle, a valve controlling the same, a pair of movable dies arranged in proximity to said nozzle and forming when together a shank cavity, a vertically movable button supporting plunger adapted to press a button against the under side of the dies to close said die cavity and a single operating means for the dies, plunger and valve.

30. A machine for forming and applying metal shanks to buttons comprising a receptacle for molten metal having an outlet nozzle, means for heating said receptacle, a valve controlling said nozzle, a pair of movable dies arranged in proximity to said nozzle and forming when together a shank cavity, a vertically movable button supporting plunger adapted to press a button against the underside of the dies to close said die cavity and a single operating means for the dies, plunger and valve.

SAMUEL B. ESHLEMAN.

Witnesses:
D. GURNEE,
L. THON.

---

Copies of this patent may be obtained for five cents each, by addressing the "Commissioner of Patents, Washington, D. C."